No. 695,224. Patented Mar. 11, 1902.
J. D. MURPHY.
FLOORING SET.
(Application filed Sept. 30, 1901.)
(No Model.) 2 Sheets—Sheet 2.
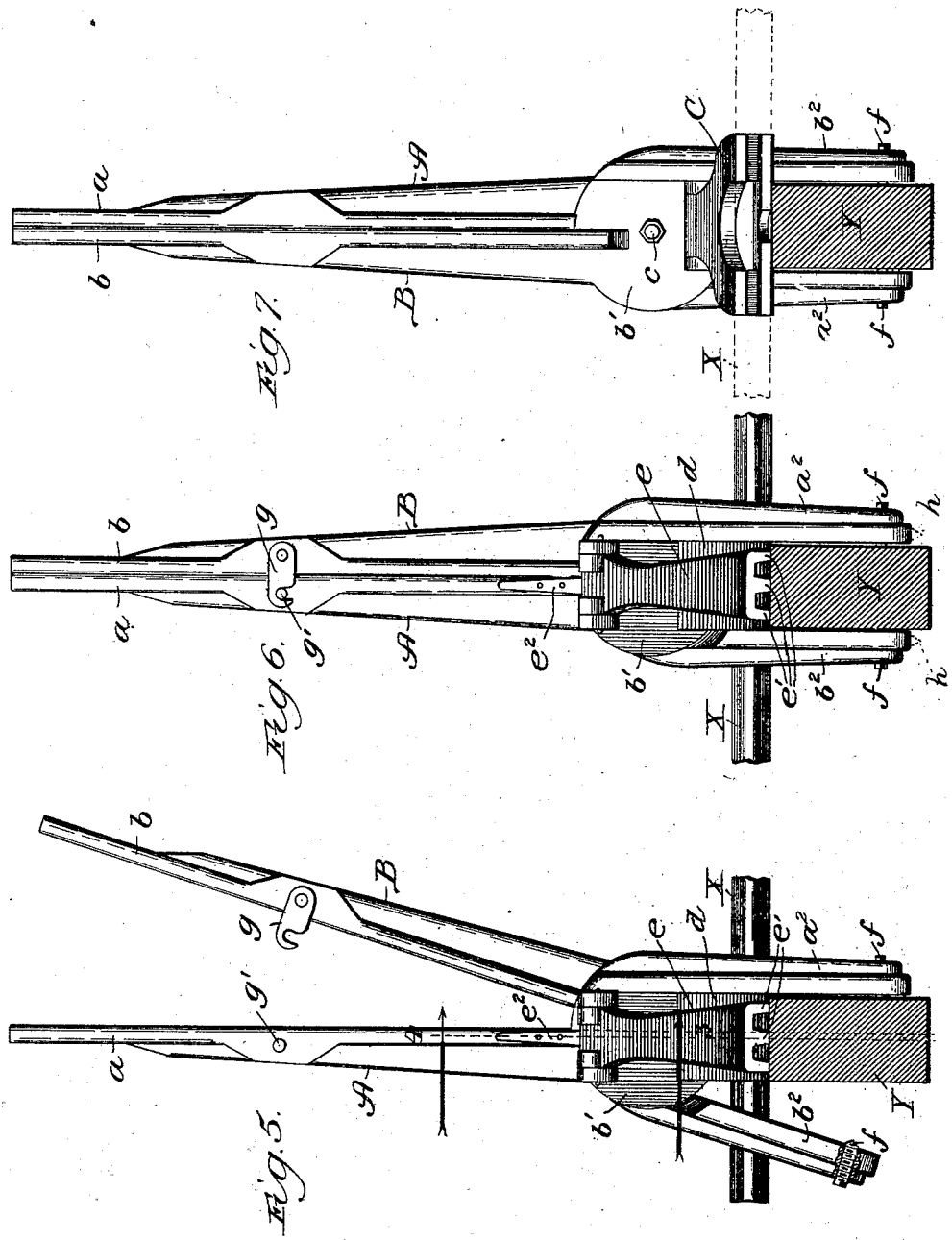
Witnesses:
Inventor:
John D. Murphy,
By Dyrenforth, Dyrenforth & Lee,
Attys.
THE NORRIS PETERS CO., PHOTO-LITHO., WASHINGTON, D. C.

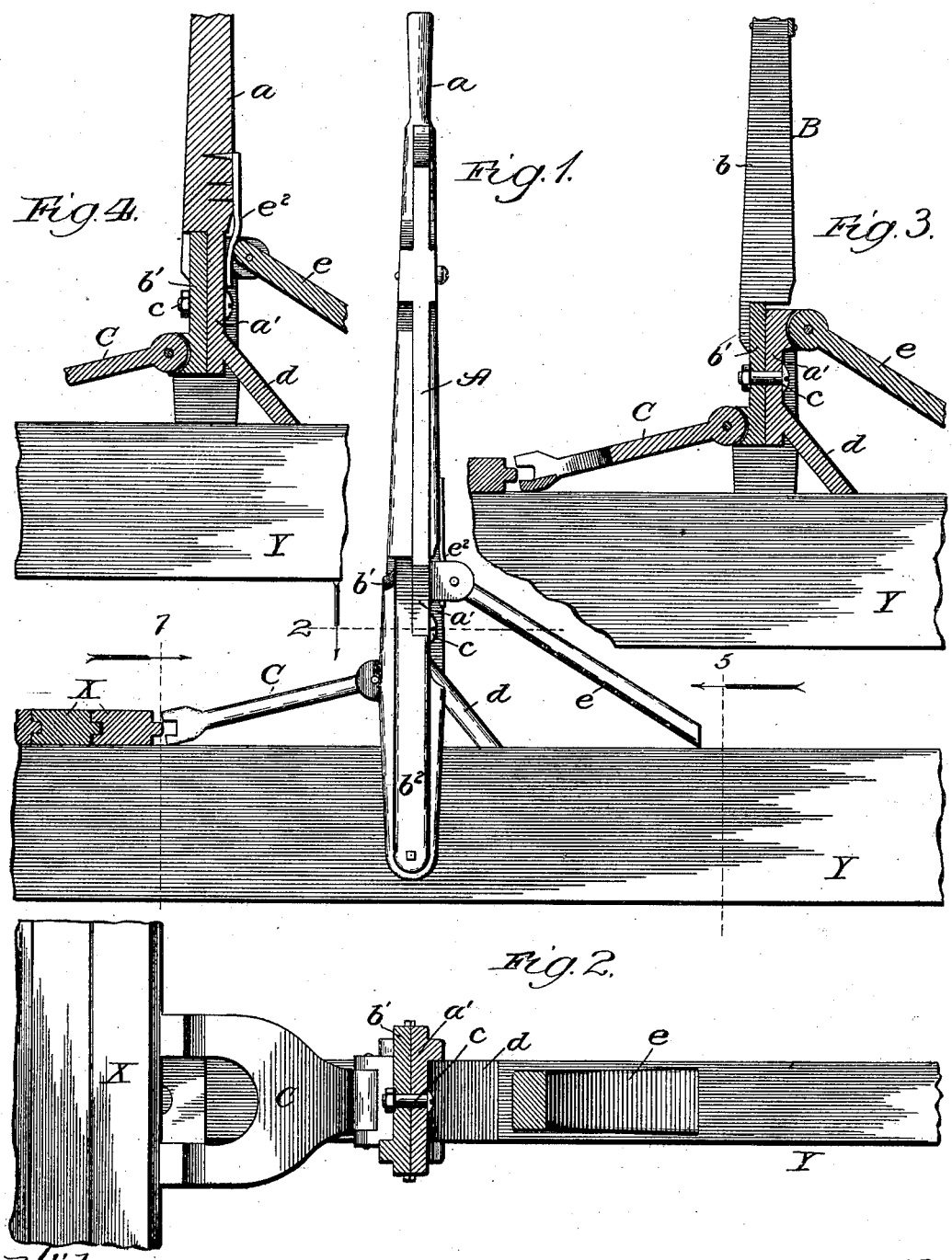

UNITED STATES PATENT OFFICE.

JOHN D. MURPHY, OF CHICAGO, ILLINOIS.

FLOORING-SET.

SPECIFICATION forming part of Letters Patent No. 695,224, dated March 11, 1902.

Application filed September 30, 1901. Serial No. 77,076. (No model.)

*To all whom it may concern:*

Be it known that I, JOHN D. MURPHY, a citizen of the United States, residing at Chicago, in the county of Cook and State of Illinois, have invented a new and useful Improvement in Flooring-Sets, of which the following is a specification.

My object is to provide an implement of improved construction for use in laying floors to force the flooring-strips together and hold them in place until nailed to prevent the occurrence of open joints in the floor.

In the drawings, Figure 1 is a view in side elevation of my improved implement, showing it in operative position upon a floor-joist, the flooring-strip being shown in section; Fig. 2, a sectional plan view taken on line 2 in Fig. 1; Figs. 3 and 4, broken sections taken, respectively, on lines 3 and 4 in Fig. 5; Fig. 5, a section on line 5 in Fig. 1, showing the implement in rear elevation with its jaws opened; Fig. 6, a view the same as Fig. 5, but showing the implement with its jaws closed and locked; and Fig. 7 a section on line 7 in Fig. 1, showing the implement in front elevation.

The implement consists of two levers A B, having the long arms or handles $a\,b$, fulcrum-disks $a'\,b'$, and short arms $a^2\,b^2$. The levers are fastened together with a bolt or the like $c$, passing centrally through the fulcrum-disks. On the fulcrum-disk $a'$ is a downward and backwardly extending piece $d$, forming a rest. Also upon the said disk is a pivotal catch $e$, serrated at its free end, as shown at $e'$, to engage with the surface against which it is pressed. On the long arm $a$ of the same lever is a leaf-spring $e^2$, which tends to press the latch downward when lowered and maintain it in a vertical plane when raised, as will be readily understood without further illustration. Pivotally secured to the disk $b'$ is a swinging floor-engaging head C, provided in its free end with a groove to fit over and engage the tongue of a flooring-strip X. Passing through the free end portions of the short arms of the levers are pointed or sharpened screws $f$, the pointed ends being on the inner sides of the levers. On the long arm $b$ of the lever B is a latch $g$, adapted to engage a stud $g'$ on the lever $a$ and lock the levers together.

In laying flooring-strips X upon floor-joists Y the operation is as follows: The implement is opened, as shown in Fig. 5, and caused to rest at the part $d$ upon the edge of the joist. It is slid along until the head C engages the strip of flooring to be pressed into place. The long arms of the levers are then brought together, as shown in Fig. 6, and locked by means of the latch $g$, causing the pins or screws $f$ to embed themselves in opposite sides of the joists and operate as a fulcrum for the implement. The implement is then swung forward, permitting the flooring-strip to be pressed into place with great force, and when the joint between the flooring-strips is closed the catch-piece $e$ is pressed downward to embed its points $e'$ in the surface of the joist, and thereby hold the implement rigid until the flooring-strip is nailed down.

As the rest-piece $d$ extends in the downward and backward direction from the crotch or saddle portion of the device, it holds the saddle portion above the joist to permit the device to be swung forward a desired distance on the fulcrum-screws $f$ without danger of the saddle's striking the joist and interfering with the operation of the device.

It frequently happens that flooring-strips become warped in seasoning, making it a matter of great difficulty to produce tight-fitting joints therewith in the laying of a floor. My improved implement is particularly well adapted for straightening and pressing the floor-strips into place. It is readily opened and moved from one position to another and permits great power to be used when required to close the joints in the floor as it is being laid. The implement may be wide enough between the arms $a^2\,b^2$ to fit over the thickest usual floor-joist, and when thinner joists are employed the adjustable fulcrum-pins or set-screws $f$ may be turned or adjusted to extend at their engaging ends nearer each other.

In order that the implement may be used in laying one floor over another, sharp projections $h$ may be provided on the lower ends of the levers, as shown by dotted lines in Fig. 6, to engage the surface of the under floor and operate as fulcrums on which the implement may be turned.

Although I prefer to construct my improved implement throughout as shown and described, it may be variously modified in the matter of detail of construction without departing from the spirit of my invention as defined by the claims.

What I claim as new, and desire to secure by Letters Patent, is—

1. In an implement for use in laying flooring-strips, the combination with the handle portion and jaw portion of a forward-projecting flooring-strip-engaging head between the ends of the implement and a downward and backward extending rest-piece between the planes of the said jaws, substantially as described.

2. In an implement for use in laying flooring-strips, the combination of a pair of companion levers fulcrumed together, the long arms of the levers forming an operating-handle and the short arms thereof forming jaws, means for locking the long arms of the levers together, a swinging flooring-strip-engaging head on the forward side of the implement between its ends and a downward and backward extending rest-piece and a swinging joist-engaging catch on the rear side of the implement between its ends, substantially as and for the purpose set forth.

3. In an implement for use in laying flooring-strips, the combination of a pair of companion levers fulcrumed together, the long arms of the levers forming an operating-handle and the short arms thereof forming jaws, adjustable joist-engaging screws on the said jaws, means for locking the long arms of the levers together, a swinging flooring-strip-engaging head on the forward side of the implement, between its ends, and a downward and backward extending rest-piece and a swinging joist-engaging catch on the rear side of the implement between its ends, and spring $e^2$ for the said catch, substantially as and for the purpose set forth.

JOHN D. MURPHY.

In presence of—
 ALBERT D. BACCI,
 M. S. MACKENZIE.